(12) United States Patent
Uehara et al.

(10) Patent No.: US 9,371,796 B2
(45) Date of Patent: Jun. 21, 2016

(54) COMBUSTION CONTROL DEVICE AND METHOD FOR DIESEL ENGINE

(75) Inventors: Issho Uehara, Yokohama (JP); Masahiko Emi, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 379 days.

(21) Appl. No.: 13/977,320

(22) PCT Filed: Jan. 5, 2012

(86) PCT No.: PCT/JP2012/000040
§ 371 (c)(1),
(2), (4) Date: Jun. 28, 2013

(87) PCT Pub. No.: WO2012/093659
PCT Pub. Date: Jul. 12, 2012

(65) Prior Publication Data
US 2013/0289849 A1    Oct. 31, 2013

(30) Foreign Application Priority Data
Jan. 7, 2011    (JP) ................................. 2011-001996

(51) Int. Cl.
| | | |
|---|---|---|
| *F02D 41/04* | (2006.01) | |
| *F02D 41/00* | (2006.01) | |
| *F02D 41/38* | (2006.01) | |
| *F02B 31/06* | (2006.01) | |
| *F02D 41/30* | (2006.01) | |
| *F02D 41/40* | (2006.01) | |
| *F02D 41/10* | (2006.01) | |

(52) U.S. Cl.
CPC ............ *F02D 41/3827* (2013.01); *F02B 31/06* (2013.01); *F02D 41/045* (2013.01);
(Continued)

(58) Field of Classification Search
CPC ............ F02D 41/3827; F02D 41/3845; F02D 41/3035; F02D 41/3836; F02D 41/403; F02D 41/045; F02D 41/105; F02D 41/3064; F02D 2001/0085; F02D 2200/0602; F02D 2041/0015; F02B 31/06; F02B 31/08; F02B 3/06
USPC ........ 73/114.43; 701/103; 123/436, 308, 302, 123/456, 475, 457, 510, 511, 306
See application file for complete search history.

(56) References Cited

U.S. PATENT DOCUMENTS 6,105,554 A * 8/2000 Nishiyama ............... F02D 41/12
                                                               123/357
6,367,452 B1 * 4/2002 Shima ................. F02D 41/3845
                                                             123/457

(Continued)

FOREIGN PATENT DOCUMENTS

| EP | 0 471 624 A2 | 2/1992 |
| EP | 1 707 785 A2 | 10/2006 |

(Continued)

OTHER PUBLICATIONS

Japanese Office Action dated Apr. 30, 2014, (3 pgs.).

*Primary Examiner* — Lindsay Low
*Assistant Examiner* — George Jin
(74) *Attorney, Agent, or Firm* — Foley & Lardner LLP

(57) ABSTRACT

A diesel engine 100 is provided with a common rail type fuel injection device. A controller 14 controls a common rail pressure and an engine control parameter other than the common rail pressure, respectively, to target values that are determined on the basis of the engine load. The controller 14 corrects the engine control parameter other than the common rail pressure when the common rail pressure does not coincide with the target common rail pressure in a transient state of the diesel engine, thereby preventing an air-fuel ratio in the combustion region from becoming lean.

8 Claims, 10 Drawing Sheets

(52) U.S. Cl.
  CPC ........ *F02D41/3035* (2013.01); *F02D 41/3836* (2013.01); *F02D 41/3845* (2013.01); *F02D 41/403* (2013.01); *F02D 41/107* (2013.01); *F02D 2041/0015* (2013.01); *F02D 2200/0602* (2013.01); *F02D 2200/101* (2013.01); *F02D 2200/602* (2013.01); *F02D 2250/31* (2013.01); *Y02T 10/44* (2013.01); *Y10T 137/7744* (2015.04)

(56) References Cited

U.S. PATENT DOCUMENTS

| | | | |
|---|---|---|---|
| 6,401,692 B1 * | 6/2002 | Grieshaber | F02D 41/3827 123/456 |
| 7,426,917 B1 | 9/2008 | Gallagher | |
| 2004/0123589 A1 * | 7/2004 | Ohtake | F02D 41/029 60/295 |
| 2004/0149253 A1 * | 8/2004 | Kikuchi | F02D 37/02 123/295 |
| 2005/0005903 A1 * | 1/2005 | Maitani | F02D 41/062 123/301 |

FOREIGN PATENT DOCUMENTS

| | | |
|---|---|---|
| JP | 2003-262152 A | 9/2003 |
| JP | 2003-293836 A | 10/2003 |
| JP | 2009-209703 A | 9/2009 |

* cited by examiner

COMBUSTION CONTROL DEVICE AND METHOD FOR DIESEL ENGINE

FIELD OF THE INVENTION

This invention relates to combustion control of a diesel engine.

BACKGROUND OF THE INVENTION

JP2003-293836A, published by the Japan Patent Office in 2003, discloses a combustion control device for a diesel engine. The device controls gas flow in an engine cylinder along with a fuel injection timing and a fuel injection amount. For example, as a magnitude of the gas flow in the cylinder increases, the fuel injection amount is also increased so as to endure a penetration performance of injected fuel. As a penetration distance is increased, mixing of an injected fuel with air is further promoted, thereby preventing a fuel-excessive region, which is a source of smoke, from being formed in the cylinder.

SUMMARY OF THE INVENTION

In this prior art device, the fuel injection amount, common rail pressure, and a swirl ratio in the cylinder are controlled to vary according to a running state of the diesel engine.

When, for example, the running state of the engine is shifted from a high-load state to a low-load state where pre-mixed combustion takes place, the fuel injection amount is decreased, the common rail pressure is lowered, and the swirl ratio is increased. Increasing the swirl ratio enhances the gas flow in the cylinder.

Among these parameters, variation in the common rail pressure takes a longer time than variation in the fuel injection amount and variation in the swirl ratio even when the variation commands are generated simultaneously. In other words, in the case of the common rail pressure, the real value thereof takes a longer time to reach a target value than in the case of the fuel injection amount and the swirl ratio. The reason is that the common rail pressure decreases only when a fuel injector injects fuel in the common rail.

As a result, when the running state of the engine is shifted from a high-load state to a low-load state and the variation commands of these parameters are generated simultaneously, fuel injection is performed in a state where the common rail pressure remains higher than the target pressure until the real common pressure reaches the target pressure. A higher common rail pressure results in greater penetration of the injected fuel and a smaller particle diameter in a fuel mist formed by the fuel injection.

A higher common rail pressure, when combined with an enhanced swirl, promotes mixing of the injected fuel with air to a greater degree than expected. As a result, a part of the injected fuel may be diffused to the outside of a combustion region formed in and around a piston cavity within the combustion chamber and the air-fuel ratio in the combustion region may locally become lean. If misfire occurs due to a lean air-fuel ratio in a local region, emission of hydrocarbon (HC) will increase.

Similarly, when the running state of the engine is shifted from a low-load state to a high-load state, an increase in the common rail pressure occurs more slowly than an increase in the fuel injection amount and a decrease in the swirl ratio in a direction for reducing the gas flow in the cylinder. Until the common rail pressure is sufficiently increased, therefore, the penetration of the injected fuel is small and diffusion of the injected fuel is not sufficiently promoted. As a result, smoke emission increases.

It is therefore an object of this invention to maintain an optimal air-fuel ratio irrespective of a difference in the control response of a common rail pressure and other parameters.

In order to achieve the above object, this invention provides a combustion control device for a diesel engine provided with a common rail type fuel injection device. The combustion control device comprises a sensor that detects an engine load of the diesel engine, a sensor that detects a common rail pressure, and a programmable controller.

The programmable controller is programmed to control a common rail pressure to a target common rail pressure which is determined on the basis of the engine load such that the target common rail pressure increases as the engine load increases, and control an engine control parameter other than the common rail pressure to a target value which is determined on the basis of the engine load.

The programmable controller is further programmed to correct the engine control parameter other than the common rail pressure when the common rail pressure does not coincide with the target common rail pressure in a transient state of the diesel engine where the engine load varies.

The details as well as other features and advantages of this invention are set forth in the remainder of the specification and are shown in the accompanying drawings.

DESCRIPTION OF THE PREFERRED EMBODIMENTS

Figure 1:
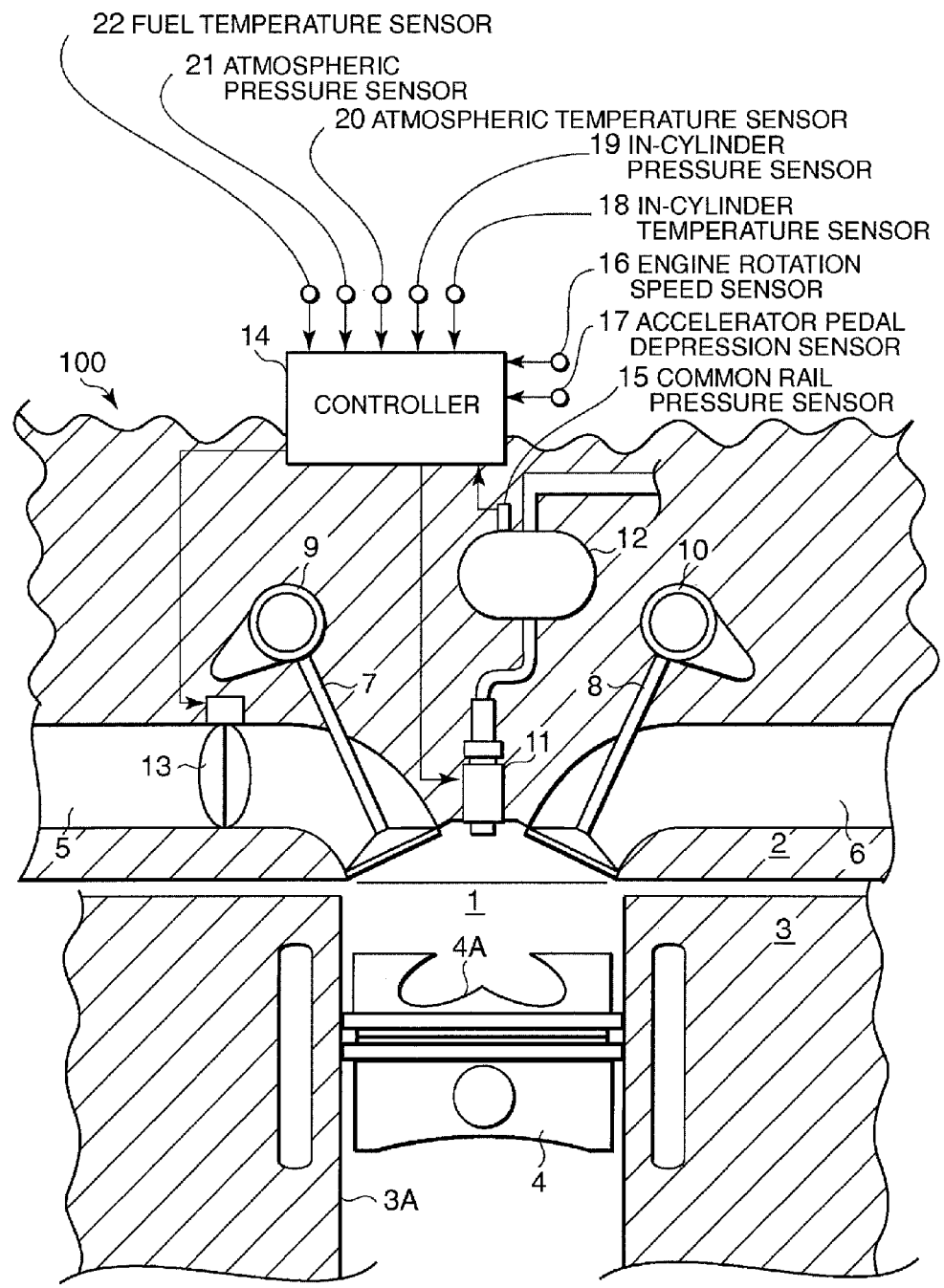
FIG. 1 is a schematic diagram of a diesel engine and a combustion control device therefor according to this invention.

Referring to FIG. 1 of the drawings, a multi-cylinder diesel engine 100 for a vehicle comprises a cylinder head 2 and a cylinder block 3. A cylinder 3A is formed in the cylinder block 3 and a piston 4 is accommodated in the cylinder 3A. A combustion chamber 1 is formed above the piston 4 in the cylinder 3A. The piston 4 has a cavity 4A facing the combustion chamber 1.

An intake port 5 is formed in the cylinder head 2 to aspirate air into the combustion chamber 1 via an intake valve 7. The intake valve 7 opens and closes in response to a rotational displacement of an air intake cam 9 that rotates synchronously with the rotation of the diesel engine 100.

An exhaust port 6 is formed in the cylinder head 2 to discharge combustion gas from the combustion chamber 1 via an exhaust valve 8. The exhaust valve 8 opens and closes in response to a rotational displacement of an exhaust cam 10 that rotates synchronously with the rotation of the diesel engine 100.

A swirl control valve 13 is installed in the intake port 5 to promote a swirl in the combustion chamber 1. A fuel injector 11 that injects fuel into the combustion chamber 1 is installed in the cylinder head 2. The fuel injector 11 is supplied with fuel from a common rail 12 that pressurizes and temporarily stores fuel.

The diesel engine 100 is constituted by a multiplicity of the combustion units as described above.

The fuel injection amount and timing of the fuel injector 11 and opening/closing of the swirl control valve 13 are controlled by a programmable controller 14.

The controller 14 is constituted by a microcomputer comprising a central processing unit (CPU), a read-only memory (ROM), a random access memory (RAM), and an input/output interface (I/O interface). The controller 14 may be constituted by a plurality of microcomputers.

The controller 14 controls a swirl ratio in the combustion chamber 1 via opening/closing of the swirl control valve 13, a fuel injection amount and timing of the fuel injector 11, and a fuel pressure in the common rail 12 via an operation of a charge pump, in response to a running state of the diesel engine 100. The fuel pressure in the common rail 12 is hereinafter referred to as a common rail pressure. The running state includes an engine load, an engine rotation speed, an in-cylinder pressure, an in-cylinder temperature, and a fuel temperature.

Further, the controller 14 performs feedback correction of the swirl ratio, when the common rail pressure deviates from a target common rail pressure determined on the basis of the engine running state while the diesel engine 100 is in a transient state.

Referring to FIGS. 2A-2F, when the diesel engine 100 operates under a high load during a time period between a time t0 and time t1, the fuel injection amount is large and the common rail pressure is high. Real values shown by solid lines respectively coincide with the target values shown by dotted lines during this time period. Since the common rail pressure is high, a penetration of injected fuel is large and an average particle diameter of fuel mist in the cylinder 3A (hereinafter referred to as a Sauter Mean Diameter (SMD)) is small.

In this situation, the swirl ratio is set to be smaller than in the case of a low-load state. When a swirl is enhanced in a state where a large amount of atomized fuel having a large penetration and a small particle diameter exists in the combustion chamber 1, diffusive combustion takes place and a combustion speed of the fuel mixture becomes excessively high, thereby generating a large combustion noise. In a high-load state of the diesel engine 100, therefore, the swirl ratio should be kept small.

On the other hand, after a time t3, the diesel engine 100 operates under a stable low-load state, and the common rail pressure is stabilized at a low target value. As a result, the penetration of the injected fuel is maintained at a small value and the SMD is maintained at a large value, accordingly.

In this case, the swirl ratio is controlled to be greater to enhance the gas flow in the combustion chamber 1, thereby compensating for a small penetration and a large SMD and enhancing a diffusion of the fuel mist such that pre-mixed combustion is promoted. The enhanced gas flow in the combustion chamber 1 may increase the combustion noise. However, in the low-load state, the fuel injection amount is small and the combustion noise is inherently small. An increase in the combustion noise thus remains in an allowable range.

Figure 2A:
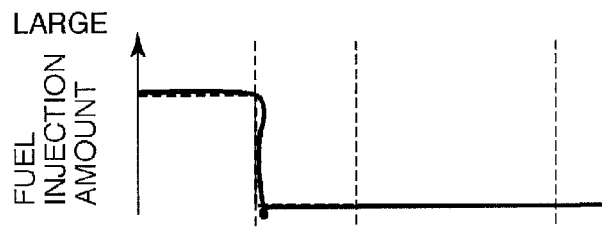
FIGS. 2A-2F are timing charts illustrating control response of engine parameters.
Figure 2B:
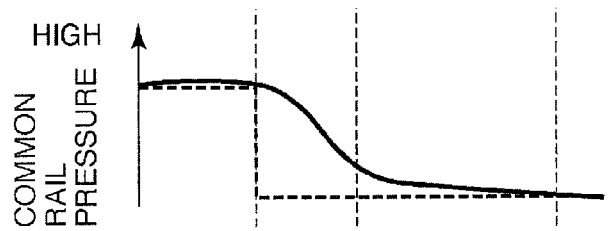
Figure 2C:
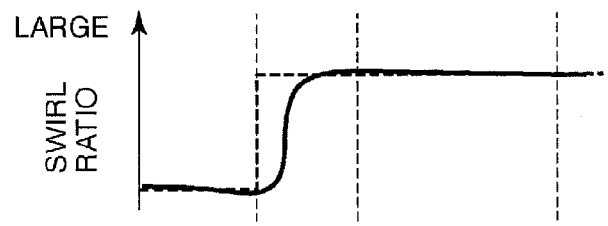
Figure 2D:
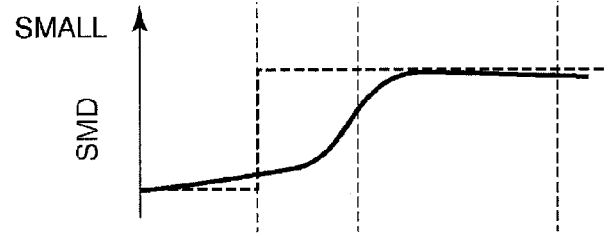
Figure 2E:
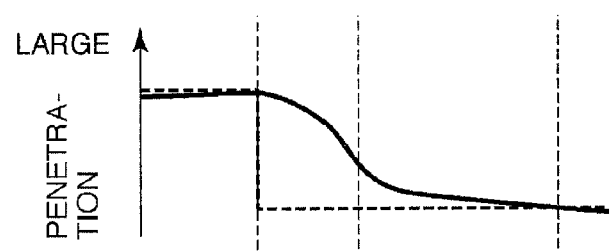
Figure 2F:
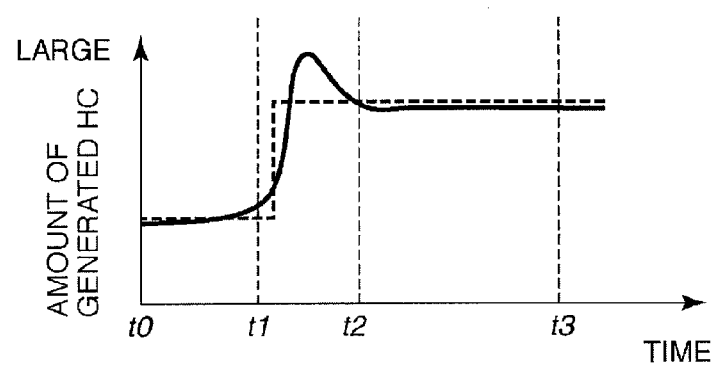

The dotted line in FIG. 2F shows an amount of generated HC in a high-load steady state and a low-load steady state. Herein, the steady state means a state in which the engine operates steadily. In a low-load steady state, the fuel injection amount is small and the combustion heat is also small. Since the amount of fuel that does not contribute to combustion is greater in the low-load steady state than in the high-load steady state, the amount of generated HC is greater in the low-load steady state than in the high-load steady state.

As shown in FIGS. 2A-2C, the fuel injection amount, the common rail pressure, and the swirl ratio vary as the engine operation state shifts from the high-load steady state to the low-load steady state. In a transient state immediately after the time t1, the variation of these parameters is as follows.

Specifically, the target values of the fuel injection amount, the common rail pressure, and the swirl ratio are immediately shifted at the time t1. The fuel injection amount shows little response delay with respect to variation in the target fuel injection amount. The swirl ratio shows a greater response delay than the fuel injection amount because a time required for the variation in the opening of the swirl control valve 13 and a time required for the variation in the gas flow in the cylinder 3A cause a response delay in the variation of the swirl ratio. The common rail pressure decreases only when the fuel injector 11 injects fuel, and hence, when the fuel injection amount is small due to the low load, the response delay in the common rail pressure with respect to the variation in the target common rail pressure is much greater than the response delay in the fuel injection amount and the swirl ratio.

As a result, as shown by the solid lines within a time period between the time t1 and a time t2 in FIGS. 2A-2C, although the fuel injection amount and the swirl ratio follow the target values with little delay, the common rail pressure continues to be higher than the target common rail pressure shown by the dotted line throughout the time period between the time t1 and the time t2.

In a transient state shifting from a high-load steady state to a low-load steady state, there is a period during which only the common rail pressure is higher than the target value, and hence, the penetration is greater and the SMD is smaller than in the low-load steady state. When the penetration is greater, the fuel mist reaches farther and when the SMD is smaller, the diffusion of the injected fuel is promoted to a higher level. As a result, the fuel mixture formed by the fuel injection spreads over a wider area of the cylinder 3A than in the low-load steady state.

The air-fuel ratio of the fuel mixture in the combustion region in the combustion chamber 1 therefore tends to be lean in this state and the amount of the generated HC increases relative to the low-load steady state.

Figure 3:
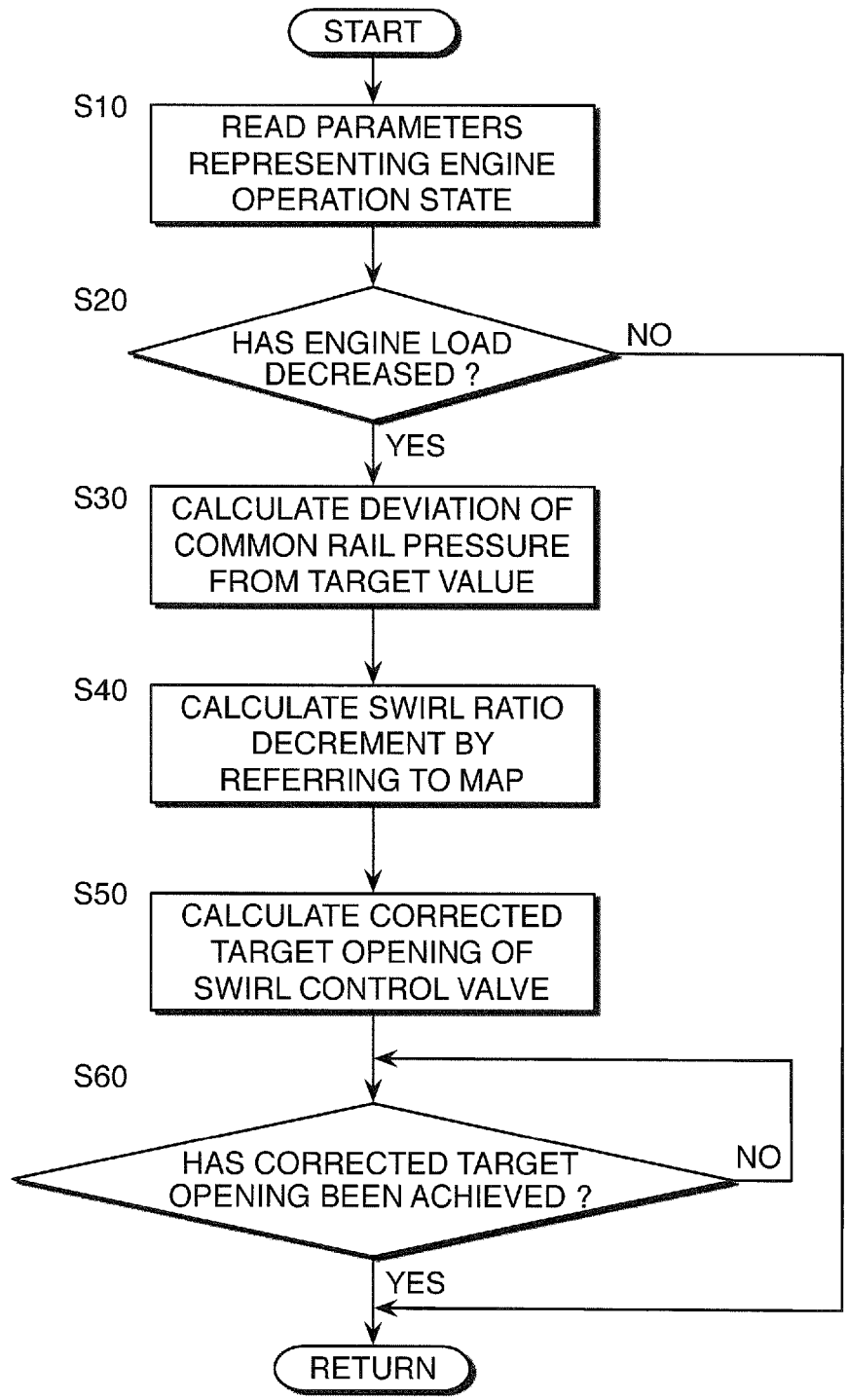
FIG. 3 is a flowchart showing a swirl ratio control routine performed by a controller according to this invention.

In order to prevent the fuel mixture from becoming lean due to a response delay in the common rail pressure as described above, the controller 14 corrects the target value of the swirl ratio by executing a swirl ratio control routine shown in FIG. 3. This routine is repeatedly executed while the diesel engine 100 operates. In other words, the controller 14 immediately resumes the next execution of the routine as it completes the current execution of the routine.

For this purpose, detection signals from an accelerator pedal depression sensor 17 that detects a depression amount of an accelerator pedal with which the vehicle is provided, an engine rotation speed sensor 16 that detects an engine rotation speed of the diesel engine 100, and a common rail pressure sensor 15 that detects the common rail pressure are input into the controller 14.

Referring to FIG. 3, in a step S10, the controller 14 reads the parameters representing the operation state of the diesel engine 100 including the engine rotation speed, the common rail pressure, and the accelerator pedal depression amount representing the engine load.

In a step S20, the controller determines if the engine load has decreased on the basis of the accelerator depression amount.

The determination in the step S20 corresponds to a determination of the start of the transient state at the time t1 in FIGS. 2A-2F. The determination may be performed on the basis of the engine rotation speed detected by the engine rotation speed sensor 16.

When the engine load has not decreased, the controller 14 terminates the routine without performing further steps.

When the engine load has decreased, the controller 14 calculates a deviation of the common rail pressure from the target common rail pressure for the low-load steady state in a step S30. Herein, the common rail pressure corresponds to the solid line and the target common rail pressure corresponds the dotted line in FIG. 2B.

Figure 4:
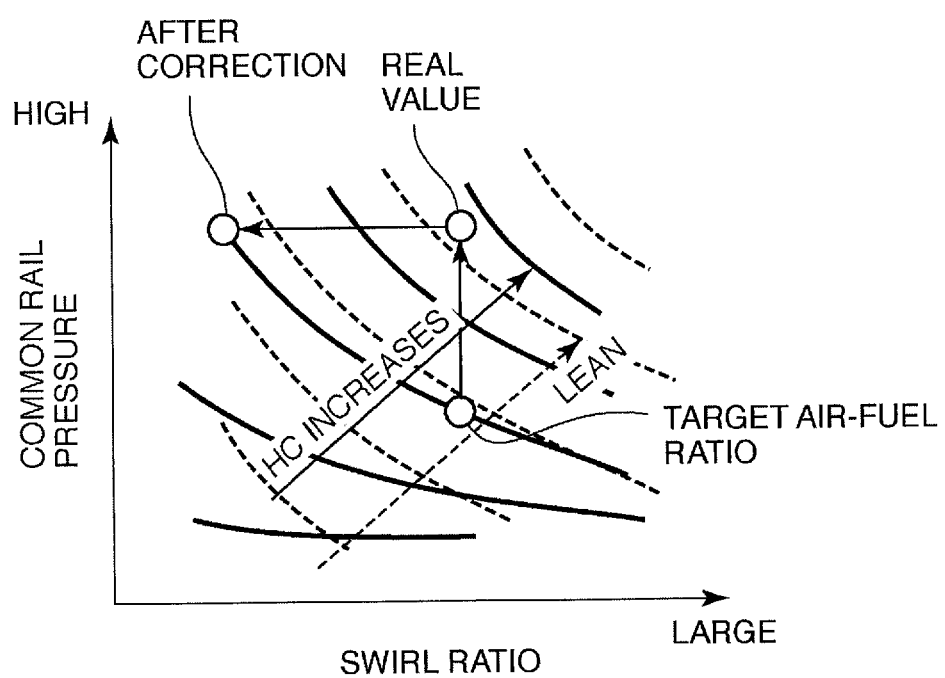
FIG. 4 is a diagram showing the characteristic of a swirl ratio correction map stored by the controller.

In a step S40, the controller 14 looks up a swirl ratio correction map, a characteristic of which is shown in FIG. 4. This map is stored in advance in the ROM of the controller 14.

Referring to FIG. 4, the abscissa represents a swirl ratio and the ordinate represents a common rail pressure. Each curved dotted line represents an air-fuel ratio of the fuel mixture formed in the combustion region in the combustion chamber 1. Each curved solid line represents an amount of generated HC. As can be seen in this figure, as the air-fuel ratio of the fuel mixture becomes lean, the amount of generated HC increases.

Providing that the real air-fuel ratio of the fuel mixture in the combustion region of the combustion chamber 1 corresponds to a value plotted as a "TARGET AIR-FUEL RATIO" in the figure, the real common rail pressure is higher than the target common rail pressure, as shown by the "REAL VALUE" in the figure. As a result, the real air-fuel ratio of the fuel mixture is leaner than the target air-fuel ratio, leading to an increase in the amount of generated HC.

In order to suppress the amount of generated HC, the air-fuel ratio must coincide with the target air-fuel ratio. In other words, the swirl ratio has to be corrected in a reducing direction until the "REAL VALUE" thereof coincides with a value located on the same solid line representing the amount of generated HC as the point of the "target air-fuel ratio". The length of an arrow pointing to the left-hand side in the figure denotes a decrement in the swirl ratio. After obtaining the decrement in the swirl ratio by referring to the swirl ratio correction map, the controller 14 determines a corrected target opening of the swirl control valve 13 to realize the decrement.

In a step S50, the controller 14 controls the opening of the swirl control valve 13 to the corrected target opening of the swirl control valve 13 determined in the step S40.

In a step S60, the controller 14 determines if the real opening of the swirl control valve 13 has reached the corrected target opening.

If the real opening of the swirl control valve 13 has reached the corrected target opening, the controller 14 terminates the routine.

If not, the controller 14 continues control of the opening of the swirl control valve 13 until the target opening is realized.

According to execution of the swirl ratio control routine described above, the deviation of the real common rail pressure from the target common rail pressure is compensated for by correction of the swirl ratio. The air-fuel ratio of the fuel mixture in the combustion region in the combustion chamber 1 is thereby prevented from becoming lean. As a result, an increase in the amount of generated HC due to a lean air-fuel ratio of the fuel mixture in the combustion region is suppressed.

In other words, an optimal air-fuel ratio is maintained in the combustion region in the combustion chamber 1 when the engine load decreases, irrespective of a difference in the control response of the common rail pressure and the other parameters.

Next, a second embodiment of this invention will be described.

Figure 5:
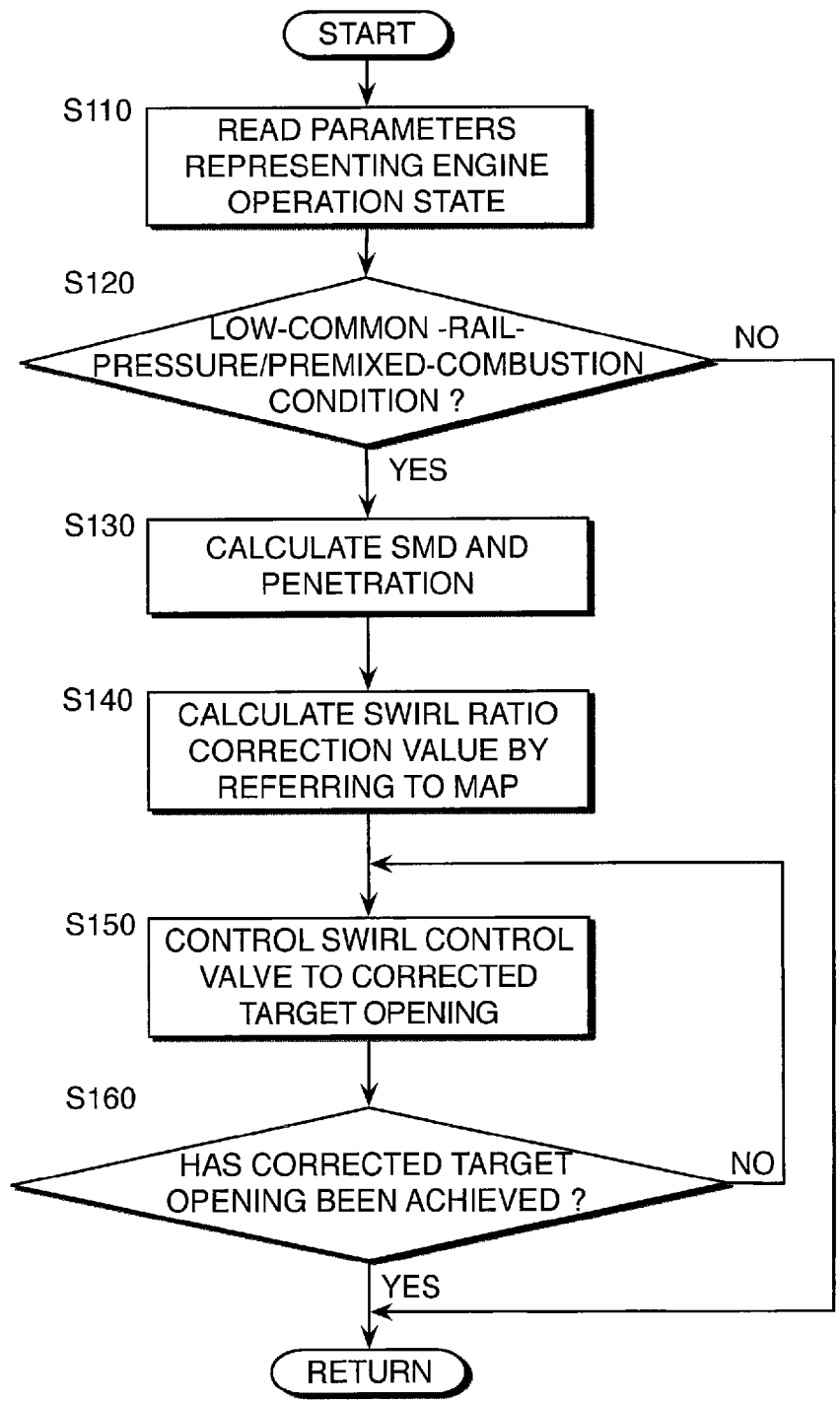
FIG. 5 is a flowchart showing a swirl ratio control routine performed by a controller according to a second embodiment of this invention.

This embodiment replaces the swirl ratio control routine of FIG. 3 with a swirl ratio control routine shown in FIG. 5.

In order to execute the routine of FIG. 5, an in-cylinder temperature sensor 18 that detects an in-cylinder temperature in the cylinder 3A, an in-cylinder pressure sensor 19 that detects an in-cylinder pressure in the cylinder 3A, an atmospheric temperature sensor 20 that detects an atmospheric temperature, an atmospheric pressure sensor 21 that detects an atmospheric pressure, and a fuel temperature sensor 22 that detects a fuel temperature are further connected to the controller 14 via a signal circuit and detection signals are input into the controller 14 respectively from these sensors 18-22.

Referring to FIG. 5, in a step S 110, the controller 14 reads the parameters representing the operation state of the diesel engine 100 including the in-cylinder temperature, the in-cylinder pressure, the atmospheric temperature, the atmospheric pressure, and the fuel temperature along with the common rail pressure and the accelerator pedal depression amount.

In a step S120, the controller 14 determines if the current operation state of the diesel engine 100 corresponds to a low-common-rail-pressure/premixed-combustion condition. The common rail pressure is detected by the common rail pressure sensor 15. When the common rail pressure is lower than a reference value, a low-common-rail-pressure condition is established. The premixed combustion condition can be determined on the basis of the in-cylinder temperature or the in-cylinder pressure or both. When one of these parameters is lower than a reference value or when both of these parameters are lower than their respective reference values, a premixed-combustion condition is established. When the low-common-rail-pressure condition and the premixed-combustion condition are satisfied, it is determined that the low-common-rail-pressure/premixed-combustion condition is established.

It should be noted that the premixed-combustion condition can be determined on the basis of the accelerator pedal depression amount, which represents the engine load. In this case, when the accelerator pedal depression amount is smaller than a reference value, it is determined that the premixed-combustion condition is established.

In a step S130, the controller 14 calculates the SMD and the penetration.

The SMD is determined according to a diameter of an injection hole of the fuel injector 11, the common rail pressure, an atmospheric pressure, a kinematic viscosity of the fuel, a density of the fuel, an absolute viscosity of the fuel, a temperature of the fuel, a viscosity of the atmosphere, and a surface tension of the fuel. Fixed values such as the diameter of the injection hole and the kinematic viscosity of the fuel may be determined in advance, while the variable values such as the common rail pressure, the atmospheric pressure, the atmospheric temperature, and the temperature of the fuel are detected using the sensors 15, 20-22.

The penetration is determined according to the diameter of the injection hole of the fuel injector 11, the common rail pressure, the atmospheric pressure, the density of the fuel, and the fuel injection period. Herein, the fixed values are determined in advance and the penetration is calculated on the basis of the variable values such as the common rail pressure, the atmospheric pressure, the atmospheric temperature, and the temperature of fuel, as in the calculation of the SMD.

The term penetration represents a penetration force of the fuel mist, but it also represents a penetration distance of the fuel mist. A strong penetration therefore means that the penetration distance of the fuel is long. In this case, diffusion of the fuel mist is further promoted, and hence the air-fuel ratio in the combustion region in the combustion chamber 1 tends to be lean.

Figure 6:
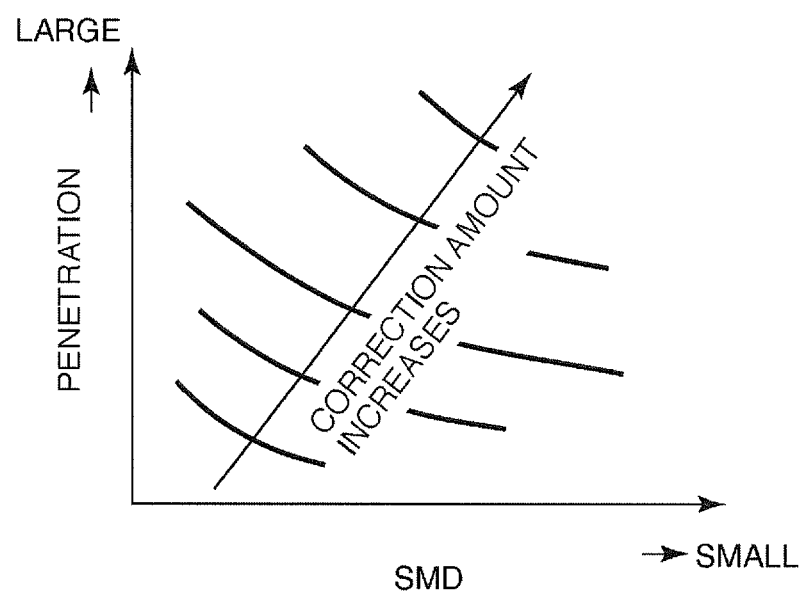
FIG. 6 is a diagram showing the characteristic of a swirl ratio correction map stored by the controller according to the second embodiment of this invention.
Figure 7A:
FIGS. 7A-7F are timing charts illustrating variation in the engine parameters as a result of execution of the swirl ratio control routine by the controller according to the second embodiment of this invention.
Figure 7B:
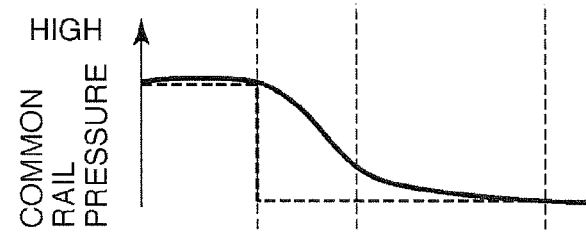
Figure 7C:
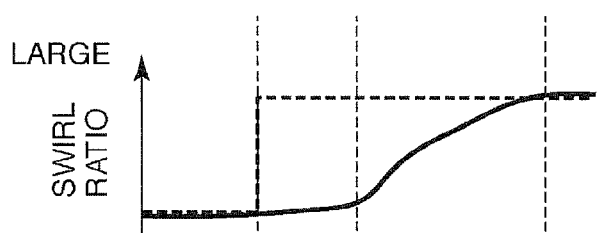
Figure 7D:
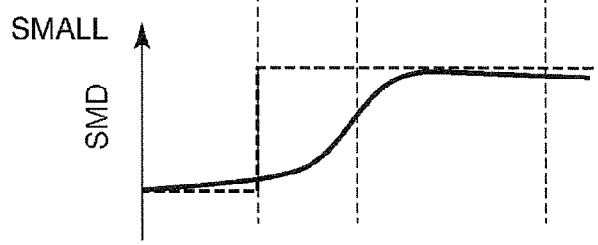
Figure 7E:
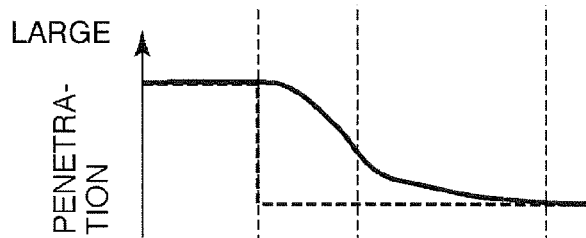
Figure 7F:
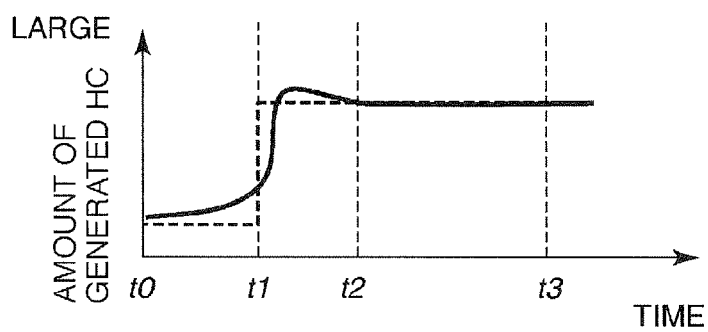

In a step S140, the controller 14 calculates a swirl ratio correction value from the SMD and the penetration by referring to a map, the characteristic of which is shown in FIG. 6. The map is stored in advance in the ROM of the controller 14.

Referring to FIG. 6, the abscissa represents the SMD and the ordinate represents the penetration. The swirl ratio correction values are represented by the curved solid lines in the figure. On the map, as the penetration becomes stronger and the SMD becomes smaller, the swirl ratio correction value increases. Herein, the swirl ratio correction value is represented as a reduction value, and hence a greater swirl ratio correction value promotes a weaker swirl or less gas flow in the cylinder 3A.

In a step S150, the controller 14 controls the opening of the swirl control valve 13 on the basis of the swirl ratio correction value. Specifically, the controller 14 calculates a corrected target opening of the swirl control valve 13 on the basis of the swirl ratio correction value and controls the swirl control valve 13 to realize the corrected target opening.

In a step S160, the controller 14 determines if the real opening of the swirl control valve 13 has reached the corrected target opening. If the real opening of the swirl control valve 13 has reached the corrected target opening, the controller terminates the routine. If not, the controller continues control of the opening of the swirl control valve 13 until the target opening is realized.

By executing the swirl ratio control routine according to the second embodiment of this invention, the swirl ratio is corrected to promote less gas flow in the cylinder 3A on the basis of the SMD and the penetration of the fuel. Accordingly, even when the common rail pressure is temporarily excessive due to a response delay, the air-fuel ratio of the fuel mixture in the combustion region in the combustion chamber 1 is prevented from becoming lean.

Referring to FIGS. 7A-7F, when the engine load drops from the high-load region to the low-load region at a time t1, the target swirl ratio increases as in the case of FIG. 2C. However, as long as the common rail pressure is higher than the target value, the swirl ratio corrected in the reducing direction using the swirl ratio correction value in the step S150. As a result of this correction, an increase in the real swirl ratio is gradual as shown by the solid line in FIG. 7C, to compensate for a gradual decrease in the common rail pressure.

As a result of the execution of the swirl ratio control routine according to the second embodiment of this invention, therefore, the air-fuel ratio of the fuel mixture in the combustion region in the combustion chamber 1 is prevented from becoming lean and the amount of generated HC is suppressed to a low level as in the case of the first embodiment.

Further, according to this swirl ratio control routine, the SMD and the penetration are calculated on the basis of the parameters including the atmospheric pressure. As the altitude of the terrain on which the vehicle travels becomes higher, the atmospheric pressure lowers. As the atmospheric pressure lowers, the penetration becomes stronger and the SMD becomes smaller. According to this swirl ratio control routine, the swirl ratio is corrected in the reducing direction as the altitude becomes higher to promote a less gas flow in the cylinder 3A, thereby compensating for the variation in the penetration and the SMD due to the variation in the altitude.

Referring to FIGS. 8, 9 and FIG. 10A-10E, a third embodiment of this invention will be described.

This embodiment also addresses the problem that arises from a difference between the control response of the common rail pressure and that of the other parameters as in the case of the first and second embodiments. However, this embodiment cancels out the effect of the response delay in the control of the common rail pressure through fuel injection control.

Performing a pre-injection prior to a main injection in a low-load steady state is typically performed as fuel injection control in a diesel engine to suppress combustion noise. This embodiment is applied specifically to a diesel engine 100 that performs a pre-injection in a low-load steady state.

According to this embodiment, a pilot injection is performed prior to the pre-injection in a transient state shifting from a high-load steady state to a low-load steady state. A total fuel injection amount in one combustion cycle remains unchanged relative to a case where the pilot injection is not performed. Herein, a total fuel injection amount of the pilot injection and the pre-injection also remains unchanged relative to a case where the pilot injection is not performed. Thus, performing the pilot injection results in a reduction in the fuel injection amount of the pre-injection.

As discussed earlier, when the penetration of the injected fuel is greater, diffusion of the fuel mist is further promoted and the air-fuel ratio in the combustion region of the combustion chamber 1 tends to be lean. Accordingly, reducing the penetration of the injected fuel suppresses diffusion of the fuel mist and prevents the air-fuel ratio in this region from becoming lean.

As discussed earlier, when the penetration of the injected fuel is greater, diffusion of the fuel mist is further promoted and the air-fuel ratio in the combustion region of the combustion chamber 1 tends to be lean. Accordingly, reducing the penetration of the injected fuel suppresses diffusion of the fuel mist and prevents the air-fuel ratio in this region from becoming lean.

The controller 14 according to this embodiment cancels out the effect of the response delay occurring during control of the common rail pressure by performing a pilot injection prior to the pre-injection when the engine load has decreased. Specifically, the controller 14 executes a fuel injection control routine shown in FIG. 8 instead of the swirl ratio control routine of FIG. 5 according to the second embodiment.

Figure 8:
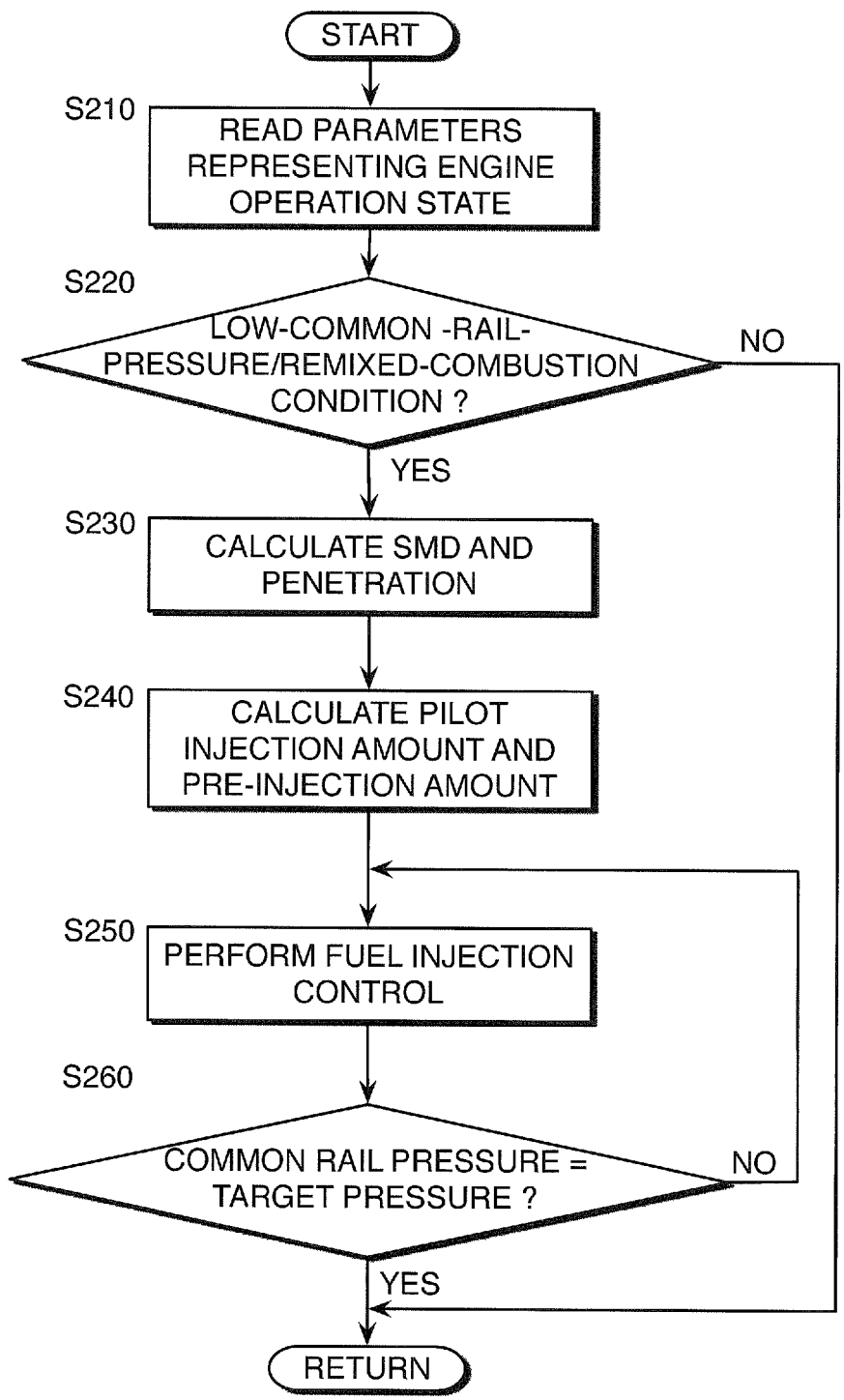
FIG. 8 is a flowchart showing a fuel injection control routine executed by a controller according to a third embodiment of this invention.

Referring to FIG. 8, since the processing of steps 210, 220, and 230 is identical to that of the steps 110, 120, and 130 in FIG. 5, respectively, the description thereof are herein omitted.

Figure 9:
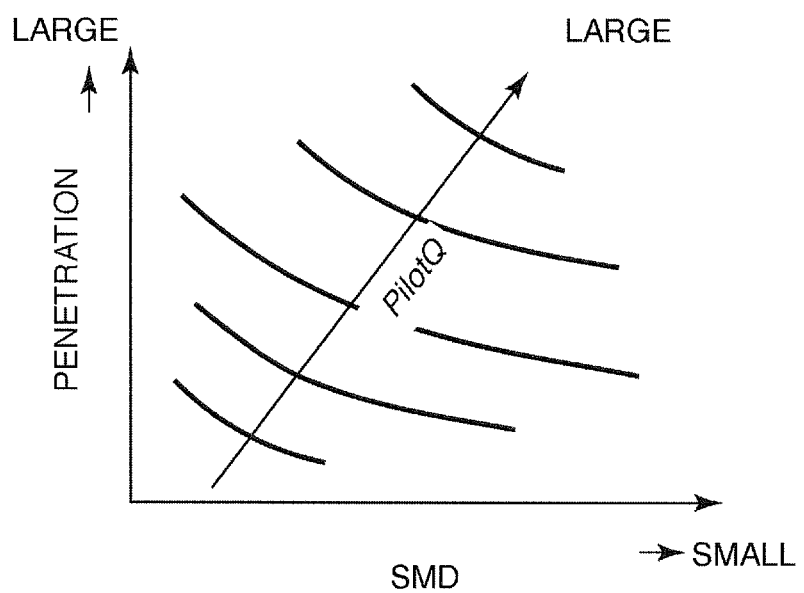
FIG. 9 is a diagram showing the characteristic of a map of a pilot injection amount PilotQ stored by the controller according to a third embodiment of this invention.

In a step S240, the controller 14 calculates a pilot injection amount PilotQ from the swirl ratio and the SMD, which were obtained in the processing of the preceding step S230. The calculation is performed by referring to a map, the characteristic of which is shown in FIG. 9. This map is stored in advance in the ROM of the controller 14. Since the pilot injection amount PilotQ depends on a cylinder bore diameter, a capacity of the combustion chamber 1, etc., the map is prepared in advance through matching.

Referring to FIG. 9, the abscissa represents the SMD and the ordinate represents the penetration. The pilot injection amounts PilotQ are represented by the curved solid lines in the figure. On the map, as the penetration becomes stronger and the SMD becomes smaller, the pilot injection amounts PilotQ increase.

As described above, the total amount of a pre-injection amount PreQ and the pilot injection amount PilotQ remain unchanged relative to the case where the pilot injection is not performed. In the step S240, the controller 14 further calculates the pre-injection amount PreQ by subtracting the pilot injection amount PilotQ from a predetermined pre-injection amount. The main injection amount is the same as in the case where the pilot injection is not performed.

After calculating the pre-injection amount PreQ and the pilot injection amount PilotQ in a step S250, the controller 14 performs the pilot injection, pre-injection, and main injection according to the injection amounts thus calculated.

In a step S260, the controller 14 determines if the real common rail pressure has decreased to the target common rail pressure. If the real common rail pressure has decreased to the target common rail pressure, the controller 14 terminates the routine. If not, the controller 14 continues the fuel injection control until the target common rail pressure is realized.

Figure 10A:
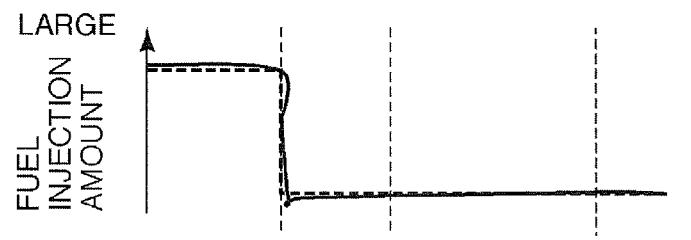
FIGS. 10A-10E are timing charts illustrating variation in the engine parameters as a result of execution of the fuel injection control routine by the controller according to the third embodiment of this invention.
Figure 10B:
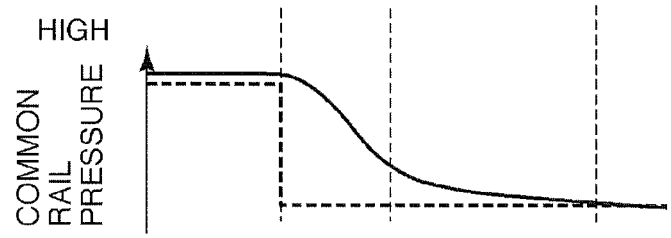
Figure 10C:
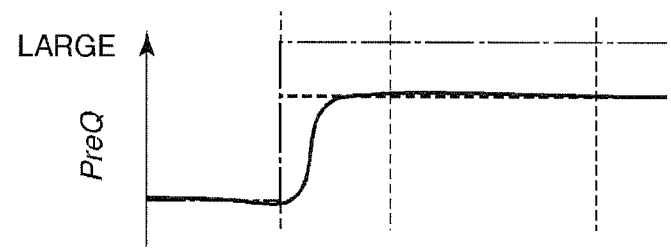
Figure 10D:
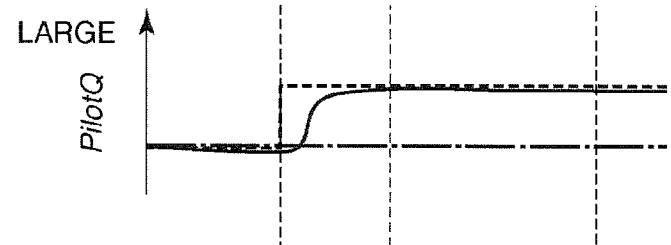
Figure 10E:
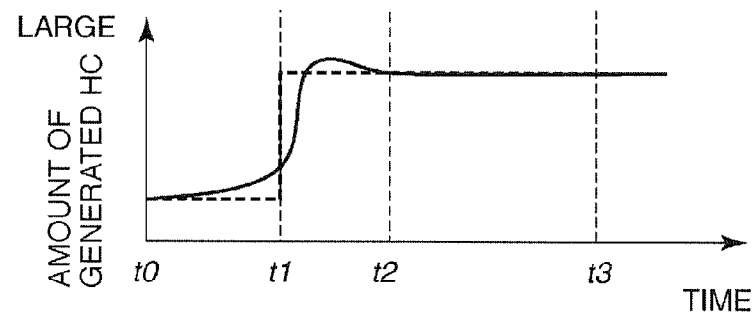

Referring to FIGS. 10A-10E, when the engine load drops from the high-load state to the low-load state at a time t1, the target common rail pressure decreases as shown by a dotted line in FIG. 10B, but the real common rail pressure does not drop immediately. As a result the swirl ratio tends to be greater than a target swirl ratio.

On the other hand, the pilot injection is started at the time t1 with the pilot injection amount of PilotQ, and the pre-injection amount PreQ decreases by the same amount PilotQ. The penetration of the fuel injected in the pre-injection is thereby decreased. Further, the pre-injection is performed towards the fuel mist formed by the pilot injection. As a result, the air-fuel ratio of the fuel mixture in the combustion region of the combustion chamber 1 is prevented from becoming leaner than a target air-fuel ratio.

The injection timing of the pilot injection and that of the pre-injection are preferably set such that all the injected fuels stay within the cavity 4A. Diffusion of the fuel mist is thereby suppressed. An interval between the pilot injection and the pre-injection is set at about five crank-angle degrees, for example. The interval can be shortened depending on the structure of the fuel injector 11.

The inventors have investigated a comparative case where the pilot injection is not performed. Herein, the total fuel amount of the pilot injection and the pre-injection are injected in the pre-injection. The fuel amount of the main injection is the same as in the case of this embodiment. In this comparative case, although the total fuel injection amount does not vary, it was not possible to reduce the amount of the generated HC as in the case of this embodiment.

The inventor assumes the reason to be as follows. Specifically, in this comparative case, since the fuel amount injected in the pre-injection is relatively large with respect to this embodiment, the penetration of the fuel injected in the pre-injection is greater than in the case of this embodiment. A part of the fuel mixture in the combustion region is thereby expelled to the outside and the air-fuel ratio in the combustion region may become leaner than the target air-fuel ratio.

By performing the pilot injection, as in the case of this embodiment, the pre-injection amount PreQ inevitably decreases. When the pre-injection amount PreQ decreases, the swirl formed by the pre-injection becomes weaker, and hence the air-fuel ratio in the combustion region is prevented from becoming lean and the amount of generated HC is suppressed to a low level as in the case of the first and second embodiments.

Since the effect of the excessive common rail pressure is compensated for by fuel injection control, a higher control response may be obtained than in the case where the compensation is achieved through control of a swirl control valve 13 or a variable valve mechanism.

The contents of Tokugan 2011-001996, with a filing date of Jan. 7, 2011 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

As described above, the combustion control according to this invention helps to reduce an amount of generated HC when an engine load shifts to a low load from a high load. Hence, this invention brings about a preferable effect when applied to a diesel engine for driving vehicles, in which the engine load varies frequently.

The embodiments of this invention in which an exclusive property or privilege is claimed are defined as follows:

1. A combustion control device for a diesel engine provided with a common rail type fuel injection device, a cylinder in which a fuel provided from the common rail type fuel injection device is burnt, and a swirl control valve which promotes a swirl in the cylinder, the combustion control device comprising:
   a sensor that detects an engine load of the diesel engine;
   a sensor that detects a common rail pressure; and
   a programmable controller programmed to:
      control a common rail pressure to a target common rail pressure that is determined on a basis of the engine load such that the target common rail pressure increases as the engine load increases;
      control a swirl ratio representing a strength of the swirl promoted by the swirl control valve to a target value which is determined on the basis of the engine load; and
      correct the swirl ratio when the common rail pressure does not coincide with the target common rail pressure in a transient state of the diesel engine where the engine load varies.

2. The combustion control device as defined in claim 1, wherein the controller is further programmed to control the swirl control valve to vary the swirl ratio on a basis of a deviation of the common rail pressure from the target common rail pressure.

3. The combustion control device as defined in claim 2, wherein the controller is further programmed to control the swirl control valve to reduce the swirl ratio when the common rail pressure is higher than the target common rail pressure.

4. The combustion control device as defined in claim 1, wherein the combustion control device further comprises a sensor that detects a rotation speed of the diesel engine, and the controller is further programmed to determine the transient state on a basis of the rotation speed.

5. A combustion control device for a diesel engine provided with a common rail type fuel injection device and a cylinder in which a fuel provided from the common rail type fuel injection device is burnt, the common rail type fuel injection device comprising a fuel injector which injects fuel into the cylinder, the combustion control device comprising:
    a sensor that detects an engine load of the diesel engine;
    a sensor that detects a common rail pressure; and
    a programmable controller programmed to:
        control a common rail pressure to a target common rail pressure that is determined on a basis of the engine load such that the target common rail pressure increases as the engine load increases;
        control a number of fuel injections performed by the fuel injector during one fuel combustion cycle in the cylinder to a target value determined on the basis of the engine load; and
        correct the number of fuel injections when the common rail pressure does not coincide with the target common rail pressure in a transient state of the diesel engine where the engine load varies.

6. The combustion control device as defined in claim 5, wherein the controller is further programmed to control the fuel injector to perform a pilot injection, a pre-injection, and a main injection during one combustion cycle of fuel in the cylinder when the common rail pressure is higher than the target common rail pressure in the transient state of the diesel engine, while keeping a total fuel injection amount during one fuel combustion cycle in the cylinder constant.

7. A combustion control method for a diesel engine provided with a common rail type fuel injection device and a cylinder in which a fuel provided from the common rail type fuel injection device is burnt, the method comprising:
    detecting an engine load of the diesel engine;
    detecting a common rail pressure;
    controlling a common rail pressure to a target common rail pressure, which is determined on a basis of the engine load such that the target common rail pressure increases as the engine load increases;
    controlling a swirl ratio representing a strength of a swirl promoted by a swirl control valve to a target value which is determined on the basis of the engine load; and
    correcting the swirl ratio when the common rail pressure does not coincide with the target common rail pressure in a transient state of the diesel engine where the engine load varies.

8. A combustion control method for a diesel engine provided with a common rail type fuel injection device and a cylinder in which a fuel provided from the common rail type fuel injection device is burnt, the common rail type fuel injection device comprising a fuel injector which injects fuel into the cylinder, the method comprising:
    detecting an engine load of the diesel engine;
    detecting a common rail pressure;
    controlling a common rail pressure to a target common rail pressure that is determined on a basis of the engine load such that the target common rail pressure increases as the engine load increases;
    controlling a number of fuel injections performed by the fuel injector during one fuel combustion cycle in the cylinder to a target value determined on the basis of the engine load; and
    correcting the number of fuel injections when the common rail pressure does not coincide with the target common rail pressure in a transient state of the diesel engine where the engine load varies.

\* \* \* \* \*